United States Patent [19]

Bundy et al.

[11] Patent Number: 5,085,707
[45] Date of Patent: Feb. 4, 1992

[54] DEFINED AND DELAMINATED KAOLIN PRODUCT

[75] Inventors: Wayne M. Bundy, Lebanon; John A. Manasso, Belle Mead; Joseph P. Berberich, Barnegat, all of N.J.

[73] Assignee: Georgia Kaolin Company, Inc., Elizabeth, N.J.

[21] Appl. No.: 537,979

[22] Filed: Jun. 14, 1990

Related U.S. Application Data

[63] Continuation-in-part of Ser. No. 197,357, May 23, 1988, Pat. No. 4,943,324.

[51] Int. Cl.$^5$ .............................................. C04B 14/10
[52] U.S. Cl. .................................... 106/486; 106/484; 106/468; 501/144; 162/181.8
[58] Field of Search ...................... 106/484, 486, 468; 501/144; 162/181.8

[56] References Cited

U.S. PATENT DOCUMENTS 3,586,523  6/1971  Fanselow et al. .................. 106/486
4,888,315 12/1989  Bowman et al. .................... 501/144

Primary Examiner—Mark L. Bell
Assistant Examiner—Alan Wright
Attorney, Agent, or Firm—Klauber & Jackson

[57] ABSTRACT

A defined and delaminated kaolin composition exhibiting high opacity is produced by defining and delaminating a base kaolin clay so as to reduce its colloidal content. The defined and delaminated kaolin composition may also be treated with hexamethylenediamine and aluminum sulfate to further enhance opacity. Whether treated or untreated, the defined and delaminated kaolin composition functions superiorly in paper coating formulations, alone or blended with known coating clays, improving the opacity, print gloss, sheet gloss and printability of paper sheet coated therewith.

8 Claims, No Drawings

DEFINED AND DELAMINATED KAOLIN PRODUCT

CROSS-REFERENCE

This application is a continuation-in-part of co-pending application Ser. No. 197,357, filed May 23, 1988 now U.S. Pat. No. 4,943,324.

BACKGROUND OF THE INVENTION

The present invention relates to a defined and delaminated kaolin composition exhibiting high opacity produced by defining and delaminating a base kaolin clay so as to reduce its colloidal content. Further, the present invention relates to a beneficiated kaolin product having improved opacifying efficiency and glossing properties, thereby rendering the product functional as a high performance paper coating pigment, and to a method of producing the beneficiated kaolin product by controllably defining, delaminating, and otherwise treating a base kaolin clay so as to remove a substantial portion of colloidal particles therein.

It is well known in the paper industry, that a wide variety of pigments, such as titanium dioxide, calcium carbonate, talc, synthetic silicates, and clays such as bentonite and kaolin, are suitable for use as paper fillers and/or coatings. Kaolin, a naturally occurring hydrated aluminum silicate, is presently the most widely utilized and is available in a range of particle sizes and brightnesses, as well as being either delaminated or non-delaminated. Hydrated kaolin is white in color, has a fine particle size, is relatively chemically inert, and makes an ideal low cost paper filler and coating pigment. Although calcined (anhydrous) kaolin is also available for use as a paper filler and in paper coatings and can impart greater opacity to paper than the hydrated kaolin, it has the serious disadvantage of being more abrasive.

Prior art kaolin paper fillers and coatings are typically produced by a beneficiation process which typically consists of fractionating in a continuous centrifuge to remove oversize material followed by leaching to remove iron-based colored compounds. In the leaching process the kaolin is acidified with $H_2SO_4$ to a pH of 3.0 to solubilize the iron. Sodium hydrosulfite is then added to reduce the iron to a more soluble ferrous form which is removed during the dewatering process. The flocculated clay, generally at approximately 30% solids be weight, is then filtered, such as by dewatering on a rotary vacuum filter to a solids level approximately 60% by weight. The filter cake is then either dried or redispersed with additional dry clay if it is to be sold as approximately 70% by weight solids slurry. To produce high brightness products, i.e., a product having a brightness index greater than 90, impurities may be removed from the kaolin clay by further processing the kaolin clay through flotation or magnetic separation. To produce a delaminated product, the coarse fraction from the initial centrifugation is ground in sand grinders to shear the stacks of platelets normally found in kaolin and thereby produce individual particles having an equivalent spherical diameter less than 2 microns.

It is well appreciated in the art that kaolin clay pigments must have certain rheological and optical properties to be suitable for use in paper manufacture as paper coatings or paper fillers. The kaolin clay pigment must be available as a high solids suspension typically having a clay solids content of about 50% to about 70% be weight, but still exhibiting a viscosity low enough to permit efficient and economical pumping, mixability with other filler or coating components, and application to the paper. Additionally, it is of utmost importance that the kaolin pigment exhibit certain optical properties, namely high brightness, high gloss and high opacity.

The influence of particle size distribution upon the optical properties of kaolin pigments has long been appreciated in the art. For example, in commonly assigned U.S. Pat. No. 2,992,936, Rowland discloses that a kaolin clay product having the following particle size distribution (in terms of equivalent spherical diameter, e.s.d.) will consistently show improved brightness, gloss and opacity when used as a paper coating clay:

99–100% by wt. less than 5 microns e.s.d.
98–100% by wt. less than 4 microns e.s.d.
88–100% by wt. less than 1.7 microns e.s.d.
85–97% by wt. less than 1.5 microns e.s.d.
70–84% by wt. less than 1.0 micron e.s.d.
25–37% by wt. less than 0.5 micron e.s.d.
10–15% by wt. less than 0.3 micron e.s.d.

Rowland further discloses producing such a controlled particle size kaolin product by first degritting a kaolin clay slurry, thence passing the degritted kaolin clay slurry at 21% solids by weight through a Sharples centrifuge at 400 cc per minute at 6300 r.p.m. and then recentrifuging the overflow effluent at the same rate and r.p.m. The final overflow effluent represented a cut taken off the fine end of the degritted clay slurry and amounted to 22% by weight of the degritted clay slurry. The degritted clay slurry remaining after the removal of this 22% fine cut, i.e., the combined underflows from the two centrifugation steps, was reslurried to about 20% solids with 0.15% sodium hexametaphosphate and allowed to settle by gravity through a 1 inch slip depth. The sedimented coarse clay, which amounted to about 48% of the degritted clay slurry, was discarded leaving about 30% by weight of the original degritted kaolin clay slurry as an intermediate product to be subjected to further treatment via bleaching, filtering and drying to yield a commercial coating clay product.

In a paper entitled "Chemically Induced Kaolin Floc Structures for Improved Paper Coating", presented at the 1983 TAPPI Coating Conference, W. H. Bundy et al. disclosed an improved high bulking paper coating pigment, referred to as 1089, which comprises a chemically modified kaolin produced by the Georgia Kaolin Company, Inc. and marketed under the trade name Astra-Lite. Structures of optimum functionality are said to be derived by chemically treating a base kaolin clay having a particle size distribution wherein from about 80% to 93% by weight of the kaolin particles are less than 2 microns e.s.d. to selectively flocculate a portion of the submicron fines therein thereby aggregating a portion of these fines on the surface of larger kaolin platelets and effectively inactivating a large portion of colloidal particles. Such a chemically modified kaolin coating pigment derived from a base kaolin wherein 92% by weight particles under 2 microns is presented by Bundy et al. as having a particle size distribution as follows:

99% by wt. less than 5 microns e.s.d.
97% by wt. less than 3 microns e.s.d.
90.5% by wt. less than 2 microns e.s.d.
65.5% by wt. less than 1 micron e.s.d.

31.5% by wt. less than 0.5 micron e.s.d.
12.5% by wt. less than 0.3 micron e.s.d.
5.5% by wt. less than 0.17 micron e.s.d.

Such a chemically flocculated kaolin coating pigment may be produced, for example, as disclosed in U.S. Pat. Nos. 4,075,030; 4,076,548 or 4,078,941, by selectively flocculating a base kaolin clay with the addition of either a low molecular weight (less than 1,000,000) organic flocculent such as a polyfunctional amine, e.g., ethylene diamine or hexamethylene diamine, or long carbon chain amine, with or without citric acid and, optionally, in the presence of fine mica below 150 mesh in size.

There is disclosed in U.S. Pat. No. 4,738,726 an opacifying pigment composition suitable for use as a paper filler or coating which consists essentially of particles of hydrous kaolin clay flocculated with a controlled minor amount of a cationic polyelectrolytic flocculent, e.g., a quaternary ammonium polymer salt or a diallyl ammonium polymer salt. The base kaolin clay is selected to have a particle size distribution prior to flocculation wherein less than 35% by weight are finer the 0.3 microns, i.e., colloidal.

In addition, the aforementioned ASTRA-LITE coating composition, Georgia Kaolin Company, Inc., the assignee of the present invention, is or has marketed a number of commercial coating clays including:

ASTRA-PAQUE: a relatively coarse calcined kaolin clay, typically having only about 80% by weight of particles less than two microns e.s.d.;

ALTOWHITE TE: a coarse calcined kaolin clay, typically having only about 42% by weight of particles less than two microns e.s.d.;

ASTRA-BRITE: a high brightness (89–91), relatively fine, uncalcined kaolin clay typically having about 92% by weight of particles less than two microns e.s.d. and about 35% to 40% by weight of particles less than 0.3 microns e.s.d.;

ASTRA-COTE 90: a high brightness (89–91), moderately sized, uncalcined kaolin clay typically having about 86% by weight of particles less than two microns e.s.d.;

ASTRA-SHEEN XG: a very fine particle size, uncalcined, delaminated kaolin clay;

ASTRA-PLATE: a fine particle size, uncalcined, delaminated kaolin clay; and

ASTRA-GLAZE: a very fine particle size, uncalcined kaolin clay typically having about 96% by weight of particles less than two microns e.s.d. and about 45% to 50% by weight of particles less than 0.3 microns e.s.d.

Additionally, No. 1, No. 2 and No. 3 coating clays are used extensively in commercial paper coating applications. No. 1 coating clay comprises a relatively fine, uncalcined kaolin typically having about 92% by weight of particles less than two microns and about 35% to 40% by weight of particles less than 0.3 microns. No. 2 coating clay comprises a relatively coarse, uncalcined kaolin typically having about 82% by weight of particles less than two microns and about 30% to 35% by weight of particles less than 0.3 microns. No. 3 coating clay comprises a quite coarse, uncalcined kaolin typically having about 73% by weight of particles less than two microns and about 25% to 30% by weight of particles less than 0.3 microns.

SUMMARY OF THE INVENTION

A high opacity, defined and delaminated kaolin clay product having a relatively narrow particle size distribution and low colloidal particle content is produced by defining and delaminating a base kaolin clay in aqueous suspension. Most advantageously, the defined and delaminated kaolin clay is surface treated with aluminum sulfate and hexamethylenediamine. Whether treated or untreated, the defined and delaminated kaolin clay of the present invention performs superiorly in paper coating composition and paper sheets coated with compositions containing, at least in part, the defined and delaminated kaolin clay of the present invention exhibit improved print gloss, sheet gloss and printability in both offset and rotogravure applications.

The coating composition may thus also comprise a blend of about 40% to about 55% by weight of dry clay of a delaminated but undefined uncalcined kaolin clay; about 10% to about 20% by weight of dry clay of a No. 1 kaolin coating clay; and about 30% to about 50% by weight of dry clay of the defined and delaminated uncalcined clay of the present invention.

DESCRIPTION OF A PREFERRED EMBODIMENT

The high performance as a paper coating of the high bulking kaolin clay product of the present invention will perhaps be most appreciated, and the process of the present invention for producing the subject high bulking kaolin clay product will perhaps be most clearly understood with reference to the examples hereinafter which are to be regarded as illustrative, not limiting, of the present invention.

In each example, the starting kaolin clay composition, hereinafter termed the base kaolin clay composition, is a commercially available kaolin clay composition marketed as a paper coating material by the aforementioned Georgia Kaolin Company, Inc. as ASTRA-BRITE coating clay. This clay composition is characterized by its high brightness, which ranges from 89 to 91, and its particle size distribution of 92% by weight less than two microns. It is to be understood, however, that other kaolin clay compositions are suitable as a starting material in practicing the present invention and that the application of the present invention is not limited to kaolin of any particular particle size distribution.

Additionally, the base kaolin clay composition used in each example was blunged in water with sodium hexametaphosphate as a dispersing agent to form an aqueous slurry. Prior to defining, the optimum dispersant level, i.e., the amount of dispersant required to achieve the point of minimum viscosity for the resultant slurry, using sodium hexametaphosphate as the dispersant was determined. An excess of 0.05% sodium hexametaphosphate over the optimum level was added to the slurry to ensure good dispersion in the subsequent defining operation. It is to be understood, however, that other dispersing agents, such as but not limited to soda ash, sodium polyacrylate, and other dispersants equivalent to sodium hexametaphosphate may be used in practicing the present invention.

Delamination as used herein refers to the operation of subjecting the naturally occurring kaolin stacks in the aqueous clay slurry to shearing force thereby reducing the kaolin stacks to thin platelets. In the examples presented herein, delamination was carried out by subjecting an aqueous slurry of stacked kaolin particles to shearing action in a sand grinder. It is to be understood, however, that the delamination may be carried out in other devices such as, but not limited to, ball or pebble mills, extruders or rotor-stator colloid mills, without departing from the spirit and scope of the present invention. Reference may be made to commonly assigned U.S. Pat. No. 3,615,806 of Andrew Torock and Thomas F. Walsh, the disclosure of which is hereby incorporated by reference, for a thorough discussion of the process of delamination of kaolin clay.

The term "defining" as used herein refers to the operation of separating and discarding a percentage of the fine fraction of the kaolin suspension. In each example presented herein, the defining operation was carried out on a centrifuge. The kaolin suspension to be "defined" was supplied to the centrifuge and processed therein to separate the suspension into a coarse fraction and a fine fraction. A selected percentage by volume of the fine fraction is discarded, while the remainder of the fine fraction is admixed with the coarse fraction for further processing. In each example, the percent defining level expressed refers to the volume percentage of the fine fraction which is discarded. For example, defining to a level of 40% means that 40% of the fine fraction from the centrifuge was discarded and that the remaining 60% of the fine fraction from the centrifuge was admixed with the coarse fraction from the centrifuge for further processing.

As is well appreciated in the art, leaching of the kaolin to remove acidic soluble brightness degrading impurities should be carried out at a pH ranging from 2.0 to 4.0. In the following examples, prior to leaching, the pH of each kaolin suspension was adjusted to a pH of 3.0 by admixing an appropriate amount of a 10% aqueous solution of sulfuric acid therewith. The kaolin suspensions were then subjected to leaching at a pH of 3.0 by admixing therewith sodium hydrosulfite at a rate of four pounds per ton of clay. After leaching the pH level of each suspension was adjusted to 5.0 by admixing therewith a sodium hydroxide solution. The kaolin suspensions were then filtered and rinsed to product a filter cake.

The surface treatment agents used in the following examples were hexamethylenediamine in a 5% aqueous solution and all hex/alum treated aluminum sulfate in a 3% aqueous solution. In all instances, the term "treatment level" with respect to surface treatment refers to the percent on a weight basis of surface treatment agent to dry clay. For example, a treatment level of 0.5% would indicate that the surface treatment agent was mixed into the aqueous clay slurry at a rate of 10 pounds of surface treatment agent per ton of dry clay.

When aluminum sulfate is present in the aqueous clay slurry, precipitation of aluminum hydroxide will begin to precipitate at a pH in excess of 4. In the examples presented herein, the pH of the aqueous clay slurry was adjusted by the addition of sodium hydroxide unto the surface of the kaolin. Reference may be made to an article entitled "The Effect of Aluminum On the Surface Properties of Kaolinite", authorized by Wayne M. Bundy and Haydn H. Murray of the Georgia Kaolin Co., and published in 1973 in CLAY AND CLAY MINERALS, VOL. 21 at pages 295-302, for a thorough discussion of the process of precipitating aluminum hydroxide onto kaolin particles.

EXAMPLE I

The base kaolin clay composition was blunged in water with sodium hexametaphosphate to form an aqueous kaolin suspension as hereinbefore described. This suspension was then subjected to delamination in a wet grinder. The delaminated suspension was then subjected to defining to a defining level of 40.5% by centrifuging in a disc-nozzle centrifuge equipped with internal recycle manufactured by Dorr-Oliver Incorporated of Stamford, Conn. The delaminated and defined product recovered from the centrifuge had a particle size distribution of 91% by weight less than 2.0 microns and 8% by weight less than 0.3 microns, i.e., colloidal particles. Thus, the particle size distribution was narrowed such that 83% by weight of the kaolin particles therein lay between 0.3 microns and 2 microns. The defined and delaminated kaolin suspension was then treated with aluminum sulfate in aqueous suspension at a treatment level of 0.7% by weight of dry clay and with hexamethylenediamine in aqueous suspension at a treatment level of 0.08% by weight of dry clay. After leaching, filtering, rinsing and redispersing as hereinbefore described, the product kaolin was incorporated into coating clay blend formulations for evaluation in both offset and rotogravure processes as compared to a commercial coating clay blend.

The commercial coating clay blend (blend A) comprised a mixture of three parts by weight of Astra-Plate ® coating clay and one part by weight of Premier ® coating clay. Astra-Plate coating clay is an undefined delaminated kaolin clay manufactured by Georgia Kaolin Company, Inc. of Union, N.J., and Premier is a No. 1 coating clay manufactured by Georgia Kaolin Company, Inc. of Union, N.J., comprising an undefined, non-delaminated kaolin clay with about 92% by weight of its kaolin particles being less than 2 microns in equivalent spherical diameter. Coating blend B comprised nine parts by weight of blend A and one part by weight of Astra-Paque ® coating clay, which is a relatively coarse calcined kaolin clay manufactured by Georgia Kaolin Company, Inc. of Union, N.J., having about only 80% by weight of its kaolin particles less than 2 microns in equivalent spherical diameter. Coating blend C comprised four parts by weight of the product kaolin of Example 1 and six parts by weight of the blend A commercial coating clay.

To evaluate the effectiveness of the product kaolin of the present invention as a coating clay, the clay blends A, B and C were each incorporated into a offset coating formulation comprising 11 parts by weight of a starch binder, 6 parts by weight of a SBR latex binder, 0.8 parts by weight of calcium stearate and 0.33 parts by weight of insolubilizer, each per 100 parts by weight of coating clay blend; and also into a rotogravure coating formulation comprising 6 parts by weight of a starch binder, 2.4 parts by weight of a SBR latex binder, 0.8 parts by weight of calcium stearate and 0.05 parts by weight of gum, each per 100 parts by weight of coating clay blend. Coated sheets were prepared by applying the coating formulations to lightweight basestock at a coat weight of 5.0 lbs/3300 ft$^2$ brightness, sheet gloss, opacity, and print gloss were measured using standard methods.

TABLE I

| Clay Blend | Coated Paper Properties | | | |
|---|---|---|---|---|
| | Brightness | Sheet Gloss | Opacity | Print Gloss |
| | Offset Formulation | | | |
| A | 67.4 | 49 | 83.1 | 69 |
| B | 68.4 | 47 | 83.7 | 66 |
| C | 68.6 | 52 | 83.9 | 72 |
| | Roto Formulation | | | |
| A | 68.6 | 57 | 84.4 | 66 |
| B | 69.3 | 56 | 84.7 | 66 |
| C | 69.0 | 60 | 84.3 | 68 |

As evident from Table I, the coating clay blend C which incorporates 60% by weight of the delaminated, defined and treated kaolin product of Example I exhibited superior opacity as compared to the commercial coating clay blends A and B in offset coating formulations. Additionally, clay blend C, which comprised 40% by weight of the delaminated, defined and treated kaolin product of Example I and 60% by weight of the commercial coating clay (blend A), also outperformed commercial blends A and B in sheet gloss and print gloss in both offset and rotogravure coating formulations.

EXAMPLE IIA

The base kaolin clay composition was processed as described in Example I except that the defining operation was carried out using a disc-nozzle centrifuge equipped with internal recycle manufactured by Alfa-Laval Inc. of Fort Lee, N.J., and the defining level was 35%. The delaminated, defined and treated kaolin product of this Example IIA was incorporated into an offset formulation comprising 10 parts by weight of Dow 620 latex binder, 9 parts by weight of Penford Gum 290 starch binder, 1.5 parts by weight of Nopco C-104, and 0.1 part by weight of Colloid 211, each per 100 parts clay.

For comparison purposes, coating formulations were also prepared using Astra-Plate ®, Astra-Brite ®, and Astra-Cote ® commercial coating clays manufactured by Georgia Kaolin Company, Inc. of Union, N.J. Test sheets were prepared by applying each coating formulation to a 31.3 pound/3300 ft² basestock at a coating weight of 7.2 pounds/3300 ft². The coated sheets were calendered 3 nips at 140° F. and a pressure of 200 pli. Brightness, opacity, sheet gloss and print gloss were measured.

TABLE IIA

| Kaolin Used | Coated Sheet Properties | | | |
|---|---|---|---|---|
| | Brightness | Sheet Gloss | Opacity | Print Gloss |
| Example IIA | 69.9 | 60 | 89.6 | 82 |
| Astra-Plate | 67.7 | 58 | 88.5 | 86 |
| Astra-Brite | 67.4 | 54 | 88.0 | 76 |
| Astra-Cote | 67.3 | 52 | 88.0 | 78 |

The superior opacity, brightness and sheet gloss of the sheets coated with an offset formulation incorporating the delaminated, defined and treated kaolin product of the present invention as compared to sheets coated with an offset formulation incorporating a commercial undefined delaminated coating clay (Astra-Plate), or relatively fine, undelaminated, undefined commercial coating clay (Astra-Brite), or a relatively coarse, undelaminated, undefined commercial coating clay (Astra-Cote), is readily apparent from Table IIA. Additionally, the print gloss of sheets coated with an offset formulation incorporating the kaolin product of Example II was also superior to that of sheets coated with an offset formulation incorporating either of the undelaminated commercial coating clays.

EXAMPLE IIB

The base kaolin clay composition was processed as described in Example I except that the defining operation was carried out using a disc-nozzle centrifuge equipped with internal recycle manufactured by Alfa-Laval Inc. of Fort Lee, N.J., at a defining level of 35%. The delaminated, defined and treated kaolin product of this Example IIB was incorporated into a rotogravure formation comprising 5.5 parts by weight of Penford Gum 290 starch binder, 4 parts by weight of Dow 620 latex binder, 1.2 parts by weight of C-104, and 0.1 parts by weight of Colloid 211, each per 100 parts clay. For comparison purposes, coating formulations were also prepared using Astra-Plate, Astra-Brite, and Astra-Cote commercial coating clays manufactured by Georgia Kaolin Company, Inc. of Union, N.J. Test sheets were prepared by applying each coating formulation to a 31.3 pound/3300 ft² basestock at a coating weight of c 7.2 pounds/3300 ft². The coated sheets were calendered 3 nips at 140° F. and a pressure of 200 pli. Brightness, opacity and sheet gloss were measured using TAPPI test methods. Additionally, rotogravure printability was evaluated by the determination of missing dots utilizing a Diamond International Printability Tester.

TABLE IIB

| Kaolin Used | Coated Sheet Properties | | | |
|---|---|---|---|---|
| | Brightness | Opacity | Sheet Gloss | Missing Dots |
| Example II B | 72.2 | 90.6 | 64 | 86 |
| Astra-Plate | 70.3 | 89.4 | 67 | 111 |
| Astra-Brite | 69.2 | 88.8 | 65 | 166 |
| Astra-Cote | 68.7 | 88.9 | 64 | 207 |

The superior opacity and brightness of the sheets coated with a rotogravure formulation incorporating the delaminated, defined and treated kaolin product of the present invention as compared to sheets with a rotogravure formulation incorporating a commercial undefined delaminated coating clay (Astra-Plate), or relatively fine, undelaminated, undefined commercial coating clay (Astra-Brite), or a relatively coarse, undelaminated, undefined commercial coating clay (Astra-Cote), is readily apparent from Table IIB. Additionally, the superior printability in a rotogravure process associated with the product kaolin of Example IIB is clearly evidenced by the substantial reduction in the number of missing dots when compared to any of the commercial coating clays.

EXAMPLE III

To further investigate the effectiveness of the defined, delaminated and treated kaolin product of the present invention in paper coating formulations, the product kaolin of Example II was used in conjunction with existing commercial coating clays to form various clay blends which were then used as the clay component in forming a coating formulation comprising 18 parts by weight of Dow 620 latex, 1 part by weight of Nopco C-104, and 1 part by weight of CMC 7L, each per 100 parts by weight of clay blend. Test sheets were prepared by applying each of these all latex binder coating formulations to a 46 pound/3300 ft² basestock at a coating weight of about 5.7 pounds/3300 ft². The coated sheets were calendered 2 nips at 140° F. and 200 pli pressure. Brightness, opacity, sheet gloss and print gloss were measured using standard methods.

TABLE III

| \ | \ | \ | \ | \ | Coated Sheet Properties Clay Blend | | | |
|---|---|---|---|---|---|---|---|---|
| Astra-Plate | Ex. II | Premier | KCS | Astra-Paque | Opacity | Brightness | Sheet Gloss | Print Gloss |
| 100 | — | — | — | — | 86.2 | 78.3 | 56 | 83 |
| 90 | — | — | — | 10 | 86.2 | 78.8 | 60 | 86 |
| 80 | — | 10 | — | 10 | 85.9 | 78.6 | 60 | 87 |
| 80 | — | 20 | — | — | 85.8 | 78.0 | 59 | 84 |
| — | 80 | 20 | — | — | 86.6 | 79.3 | 68 | 88 |
| 80 | — | — | 20 | — | 85.6 | 77.8 | 57 | 84 |
| — | 80 | — | 20 | — | 86.3 | 79.0 | 67 | 89 |
| — | 100 | — | — | — | 86.9 | 79.8 | 69 | 92 |

As seen in Table III, in all blends, the replacement of Astra-Plate, a commercial undefined, delaminated coating clay, with the defined, delaminated and treated kaolin product of Example II, resulted in significant improvements in opacity, brightness, sheet gloss and print gloss. A coating formulation containing the product kaolin of the present invention alone or in a blend with No. 1 or No. 2 coating clay outperformed coating formulation containing blends incorporating calcined clay in opacity and gloss performance.

EXAMPLE IV

In order to ensure that the product kaolin coating clay of the present invention did not have an adverse impact on paper coater runnability, i.e, a reduction in the speed at which a coating formulation can be applied without streaking or skipping, three lightweight coating formulations were made and tested for "runnability" on a cylindrical laboratory coater by determining the maximum speed at which the coating formulation could be applied on this coater without the occurrence of streaking or skipping. In each case, the coating formulation was formulated at 56% solids by weight and applied at a coating weight of 4, 5 and 6 pounds/3300 ft² to a 28 pound/3330 ft² uncoated basestock. The lightweight coating formulation used comprised in each case 11 parts by weight of Stayco M starch binder, 6 parts by weight of Gen Flo 5092 latex binder, 0.8 parts by weight of Flowco calcium stearate and 0.3 parts by weight of Sunrez 720, each per 100 parts of clay. Coating formulations were produced using each of the following clay blends (in parts by weight):

A.
  67.5 parts undefined, delaminated coating clay (Astra-Plate)
  22.5 parts No. 1 coating clay (Premier)
  10.0 parts calcined coating clay (Astra-Paque)
B.
  48.8 parts undefined, delaminated coating clay (Astra-Plate)
  16.2 parts No. 1 coating clay (Premier)
  35 parts Example II product
C.
  45 parts undefined, delaminated coating clay (Astra-Plate)
  15 parts No. 1 coating clay (Premier)
  40 parts Example II product Runnability tests on the laboratory coater indicated that both coating formulations B and C, each of which incorporated the undefined, delaminated and treated product of the present invention, could be applied at a coating speed of 2400 feet/minute without encountering coating defects as compared to a maximum speed of only 2200 feet/minute for coating formulation A which incorporated a clay blend consisting only of commercially available prior art coating clays.

As is evident from the testing results hereinbefore described, the defined, delaminated and treated kaolin product of the present invention outperforms most prior art kaolin clays in paper coating applications. In fact, the delaminated and defined kaolin product of the present invention even if untreated, performs as well as typical commercial coating clay blends. As illustrated in Table IV, a kaolin product produced by defining and delaminating the base kaolin at defining levels of 30%, 35% or 40% via centrifugation on a centrifuge without internal recycle, even when untreated with aluminum sulfate and hexamethylenediamine, produced lightweight coating formulations exhibiting superior printability and gloss characteristics in comparison to a typical commercial lightweight coating formulation incorporating the commercial coating clay blend A of Example IV.

TABLE IV

| Clay | Coated Paper Properties | | | | |
|---|---|---|---|---|---|
| | Defining Level | Opacity | Brightness | Sheet Gloss | Print Gloss | Missing Dots |
| Defined, delaminated but untreated | 30% | 87.9 | 73.0 | 54 | 70 | 24 |
| | 35% | 87.4 | 72.9 | 56 | 73 | 16 |
| | 40% | 87.7 | 72.9 | 55 | 73 | 16 |
| Commercial (Ex IV A) | | 88.8 | 73.0 | 50 | 69 | 32 |

Although surface treatment with aluminum sulfate and hexamethylenediamine will further enhance the coating characteristics of the product defined and delaminated kaolin product of the present invention, it is clear that an untreated defined and delaminated product produced in accordance with the present invention provides a lower cost coating clay which will exhibit superior printing properties while having an opacity which comes close to that of prior commercial coating clays. By defining and delaminating a relatively fine base kaolin clay, a kaolin product having a much narrower particle size distribution is produced, which product exhibits high opacity and excellent printing characteristics in coating formulations, whether or not it is further treated with aluminum sulfate and hexamethylenediamine.

The resulting defined and delaminated product of the present invention is characterized relative to commercial coating clays by its narrower particle size distribution. By defining a relatively fine base kaolin to remove a substantial amount of the colloidal material therefrom, the product kaolin will have about the same level of coarse material, i.e, greater than 2 micron e.s.d. particles, as the base kaolin, but a reduced level of finer particles, particularly colloidal material, i.e., sub 0.3 micron e.s.d. particles. Advantageously, the defined and delaminated product of the present invention will exhibit a particle size distribution such that at least about 70% by weight of the particles therein are larger than 0.3 microns and smaller than 2.0 microns in equivalent spherical diameter.

We claim:

1. A kaolin paper coating composition comprising a suspension in water of defined and delaminated uncalcined kaolin clay particles having a narrow particle size distribution such that at least 70% of the kaolin particles therein have a particle size of at least 0.3 microns and less than 2 microns in equivalent spherical diameter, said kaolin particles being produced by delaminating and defining a base kaolin clay which is an uncalcined kaolin having a brightness of at least 89, so as to remove a substantial portion of the colloidal particle content from the base kaolin clay, and having increased opacifying and gloss properties when compared to the base kaolin clay.

2. A coating composition as recited in claim 1 comprising a blend of
   a. about 40% to about 55% by weight of dry clay of a delaminated but undefined uncalcined kaolin clay;
   b. about 10% to about 20% by weight of dry clay of a No. 1 kaolin coating clay; and
   c. about 30% to about 50% by weight of dry clay of said defined and delaminated uncalcined kaolin clay.

3. A coating composition as recited in claim 1 consisting essentially of
   a. about 20% by weight of dry clay of a No. 1 kaolin coating clay, a No. 2 kaolin coating clay, and mixtures thereof; and
   b. about 80% by weight of dry clay of said defined and delaminated uncalcined kaolin clay.

4. A coating composition suitable for coating paper sheets which is a blend comprising
   a. a defined and delaminated uncalcined kaolin clay having a narrow particle size distribution such that at least 70% of the kaolin particles by weight are between 0.3 microns and 2 microns equivalent spherical diameter, said kaolin clay being produced by defining and delaminating a base kaolin clay which is an uncalcined kaolin having a brightness of at least 89 so as to remove a substantial portion of the colloidal particle content from the base kaolin clay; and
   b. up to 20% by weight of at least one kaolin clay selected from the group consisting of a delaminated but undefined uncalcined kaolin clay, a No. 1 kaolin coating clay, a No. 2 kaolin coating clay, and mixtures thereof.

5. A coating composition as recited in claim 4 wherein said defined and delaminated uncalcined kaolin clay as an aqueous slurry is surface and hexamethylenediamine subsequent to delaminating and defining.

6. A coating composition as recited in claim 5 wherein said defined and delaminated uncalcined kaolin clay comprises at least about 30% by weight of the kaolin clay in said blend.

7. A coating composition as recited in claim 6 consisting essentially of
   a. about 40% to about 55% by weight of dry clay of a delaminated but undefined uncalcined kaolin clay;
   b. about 10% to about 20% by weight of dry clay of a No. 1 kaolin coating clay; and
   c. about 30% to about 50% by weight of dry clay of said defined, delaminated and treated uncalcined kaolin clay.

8. A coating composition as recited in claim 6 consisting essentially of
   a. about 20% by weight of dry clay of a No. 1 kaolin coating clay, a No. 2 Kaolin coating clay, and mixtures thereof; and
   b. about 80% by weight of dry clay of said defined, delaminated and treated uncalcined kaolin clay.

* * * * *